Patented July 6, 1926.

1,591,271

UNITED STATES PATENT OFFICE.

HENRY BLUMENBERG, JR., OF LOS ANGELES, CALIFORNIA, ASSIGNOR TO STOCKHOLDERS SYNDICATE, OF LOS ANGELES, CALIFORNIA, A CORPORATION OF CALIFORNIA.

PROCESS OF REDUCING PHOSPHATE ROCK.

No Drawing.   Application filed June 23, 1925. Serial No. 39,042.

My invention relates to a process of reducing phosphate rock to produce potassium or sodium phosphates.

It is an object of this invention to provide a simple, efficient and economical process of treating phosphate rock by fusing the same with an alkali metal sulphate and subsequently treating the finely ground mass in the presence of water with sulphur dioxide gas, thereby producing alkali metal phosphates and either separating the alkali metal phosphates from the mixture or using the whole mass as a commercial fertilizer.

My invention consists in the steps of the process hereinafter described and claimed.

Ground phosphate rock $Ca_3(PO_4)_2$ is mixed with potassium sulphate $K_2SO_4$, the potassium sulphate being in excess of the molecular equivalents required to produce potassium calcium pyro phosphate in accordance with the following equation:

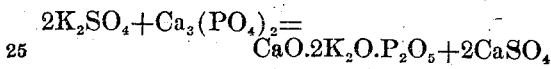

$$2K_2SO_4 + Ca_3(PO_4)_2 = CaO.2K_2O.P_2O_5 + 2CaSO_4$$

The temperature of the mixture is raised to the fusion point, approximately 1000° C. and the mass is kept for several hours in the state of fusion. It is then either allowed to cool or run into water and ground to a mesh not less than 150 and mixed with water. The mixture is then subjected to a treatment of sulphur dioxide until completely decomposed, when calcium and potassium sulphites and potassium di-hydrogen phosphate are formed, in accordance with the following equation:

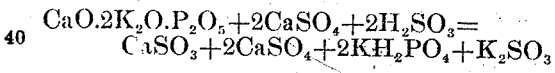

$$CaO.2K_2O.P_2O_5 + 2CaSO_4 + 2H_2SO_3 = CaSO_3 + 2CaSO_4 + 2KH_2PO_4 + K_2SO_3$$

The mixture may now be evaporated to dryness and used as a commercial fertilizer, or the mixture is filter pressed and the solid constituents separated from the insoluble salts, which latter may be segregated by any suitable or preferred method.

In place of the normal potassium sulphate the acid potassium sulphate may be used, the final product being the same.

In place of potassium sulphates the corresponding sodium sulphates may be used, producing the corresponding sodium phosphates.

The terms alkali metal sulphate and potassium sulphate in the claims are intended to cover both the normal and acid salts.

Various changes may be made in the steps of the process by those skilled in the art, without departing from the spirit of my invention, as claimed.

I claim:—

1. A process of treating phosphate rock comprising mixing the ground phosphate rock with an alkali metal sulphate, heating the mixture until the mass is fused, cooling and pulverizing the mass, subjecting the same in the presence of water to sulphur dioxide, thereby forming alkali metal phosphate.

2. A process of treating phosphate rock comprising mixing the ground phosphate rock with potassium sulphate, heating the mixture until the mass is fused, cooling and pulverizing the mass, subjecting the same in the presence of water to sulphur dioxide, thereby forming potassium phosphate.

3. A process of treating phosphate rock comprising mixing the ground phosphate rock with potassium sulphate in excess of the molecular equivalents required to form potassium calcium pyro phosphate, heating the mixture until the mass is fused, cooling and pulverizing the mass, subjecting the same in the presence of water to sulphur dioxide, thereby forming potassium phosphate.

In testimony whereof I have signed my name to this specification.

HENRY BLUMENBERG, JR.